United States Patent
Circosta et al.

(10) Patent No.: US 10,499,205 B2
(45) Date of Patent: Dec. 3, 2019

(54) SMS PROXYING

(71) Applicant: Apple Inc., Cupertino, CA (US)

(72) Inventors: Nicholas J. Circosta, Mountain View, CA (US); Pierre J. de Filippis, Sunnyvale, CA (US); Roberto Garcia, Santa Clara, CA (US); Justin N. Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/293,076

(22) Filed: Oct. 13, 2016

(65) Prior Publication Data

US 2017/0034676 A1    Feb. 2, 2017

Related U.S. Application Data

(63) Continuation of application No. 14/475,042, filed on Sep. 2, 2014, now Pat. No. 9,473,912.
(Continued)

(51) Int. Cl.
*H04W 4/00* (2018.01)
*H04W 4/14* (2009.01)
(Continued)

(52) U.S. Cl.
CPC ............. *H04W 4/14* (2013.01); *H04L 67/303* (2013.01); *H04W 4/16* (2013.01); *H04W 8/22* (2013.01);
(Continued)

(58) Field of Classification Search
CPC ........... H04W 4/14; H04W 4/16; H04W 8/22; H04W 88/182; H04W 88/04; H04L 67/303; H04L 67/26; H04M 1/72563
See application file for complete search history.

(56) References Cited

U.S. PATENT DOCUMENTS

| 1,295,368 A | 2/1919 | Pilkington |
| 2,671,522 A | 3/1954 | Bourgeois |
(Continued)

FOREIGN PATENT DOCUMENTS

| CN | 1550112 A | 11/2004 |
| JP | 2009164780 A2 | 7/2009 |
(Continued)

OTHER PUBLICATIONS

Notice of Allowance and Fee(s) Due dated Jan. 11, 2017 in U.S. Appl. No. 14/475,060. 20 pages.
(Continued)

*Primary Examiner* — Barry W Taylor
(74) *Attorney, Agent, or Firm* — Kilpatrick, Townsend & Stockton

(57) ABSTRACT

A system and method are described for establishing two-way communication between proxy devices that have a certain set of hardware and/or capabilities allowing the proxy devices to send and receive SMS/MMS messages using cellular networks on behalf of proxied devices that lack the hardware and/or capabilities. The proxy device can receive a message from a service provider. The message may be associated with information, and the proxy device can determine a recipient of the message based at least in part on the information. The proxy device can determine whether delivery of the message to the recipient is restricted and, if not, transmit the message the proxied device and/or the recipient.

19 Claims, 11 Drawing Sheets

Related U.S. Application Data

(60) Provisional application No. 62/005,336, filed on May 30, 2014.

(51) Int. Cl.

| | | |
|---|---|---|
| *H04W 88/18* | (2009.01) | |
| *H04W 4/16* | (2009.01) | |
| *H04W 8/22* | (2009.01) | |
| *H04L 29/08* | (2006.01) | |
| *H04W 12/08* | (2009.01) | |
| *H04M 1/725* | (2006.01) | |
| *H04W 88/04* | (2009.01) | |

(52) U.S. Cl.
CPC ......... *H04W 12/08* (2013.01); *H04W 88/182* (2013.01); *H04L 67/26* (2013.01); *H04M 1/72563* (2013.01); *H04W 88/04* (2013.01)

(56) References Cited

U.S. PATENT DOCUMENTS

| | | | |
|---|---|---|---|
| 3,140,564 A | 7/1964 | Chapman | |
| 3,266,722 A | 8/1966 | Hobbis | |
| 3,481,427 A | 12/1969 | Dobbs et al. | |
| 3,612,305 A | 10/1971 | Wasserman | |
| 3,963,094 A | 6/1976 | Nowikas | |
| 4,272,934 A | 6/1981 | Cowden et al. | |
| 4,391,073 A | 7/1983 | Mollenkopf et al. | |
| 4,423,574 A | 1/1984 | Pierre | |
| 4,702,046 A | 10/1987 | Haugen et al. | |
| 4,785,598 A | 11/1988 | Stronach | |
| 5,579,622 A | 12/1996 | DeVon et al. | |
| 6,698,543 B2 | 3/2004 | Golterman | |
| 7,130,664 B1 | 10/2006 | Williams | |
| 8,068,860 B1 | 11/2011 | Midkiff | |
| 8,787,006 B2 | 7/2014 | Golko | |
| 8,964,947 B1* | 2/2015 | Noolu | H04M 3/541 |
| | | | 379/88.01 |
| 9,473,912 B2 | 10/2016 | Circosta et al. | |
| 9,654,581 B2 | 5/2017 | Pollack et al. | |
| 9,819,779 B2* | 11/2017 | Lee | H04M 1/576 |
| 2002/0115478 A1 | 8/2002 | Fujisawa et al. | |
| 2007/0239884 A1 | 10/2007 | Karmakar et al. | |
| 2008/0292074 A1* | 11/2008 | Boni | H04M 3/54 |
| | | | 379/93.11 |
| 2008/0313284 A1 | 12/2008 | Doyle | |
| 2009/0158397 A1 | 6/2009 | Herzog et al. | |
| 2009/0252072 A1 | 10/2009 | Lind et al. | |
| 2010/0093382 A1 | 4/2010 | Samaha | |
| 2010/0216434 A1 | 8/2010 | Marcellino et al. | |
| 2010/0227605 A1 | 9/2010 | Fournier | |
| 2010/0227632 A1 | 9/2010 | Bell et al. | |
| 2011/0087258 A1 | 4/2011 | Sluss | |
| 2012/0063385 A1 | 3/2012 | Yang et al. | |
| 2012/0077467 A1* | 3/2012 | Fan | H04W 4/12 |
| | | | 455/414.1 |
| 2012/0152468 A1 | 6/2012 | Melhart | |
| 2012/0297463 A1* | 11/2012 | Orbach | G06Q 10/107 |
| | | | 726/4 |
| 2012/0302268 A1* | 11/2012 | Casto | H04W 4/08 |
| | | | 455/466 |
| 2012/0307655 A1 | 12/2012 | Vyrros | |
| 2013/0031516 A1 | 1/2013 | Sawayanagi et al. | |
| 2013/0282838 A1* | 10/2013 | Zhu | H04L 51/12 |
| | | | 709/206 |
| 2013/0301516 A1* | 11/2013 | Ur | H04W 76/02 |
| | | | 370/315 |
| 2013/0311594 A1 | 11/2013 | Luna et al. | |
| 2014/0016554 A1 | 1/2014 | Lee et al. | |
| 2014/0045547 A1 | 2/2014 | Singamsetty et al. | |
| 2014/0115125 A1 | 4/2014 | Chen et al. | |
| 2015/0026356 A1* | 1/2015 | Kaplinger | H04L 69/18 |
| | | | 709/230 |
| 2015/0099505 A1 | 4/2015 | Kiukkonen | |
| 2015/0237670 A1* | 8/2015 | Mao | H04W 76/04 |
| | | | 455/404.1 |
| 2015/0350362 A1 | 12/2015 | Pollack et al. | |
| 2015/0350856 A1 | 12/2015 | Circosta et al. | |
| 2015/0372746 A1* | 12/2015 | Xie | H04W 76/18 |
| | | | 455/11.1 |
| 2017/0237986 A1* | 8/2017 | Choi | H04B 1/385 |
| | | | 348/14.02 |

FOREIGN PATENT DOCUMENTS

| | | | |
|---|---|---|---|
| JP | 2009164783 A2 | 7/2009 | |
| JP | 2010268330 A2 | 11/2010 | |
| WO | 2013/076533 A1 | 5/2013 | |
| WO | 2015/183829 A1 | 12/2015 | |

OTHER PUBLICATIONS

International Search Report and Written Opinion dated Sep. 2, 2015 in PCT/US2015/032477, 10 pages.
Non-Final Office Action dated Mar. 4, 2016 in U.S. Appl. No. 14/475,042. 21 pages.
Notice of Allowance dated Jun. 22, 2016 in U.S. Appl. No. 14/475,042. 10 pages.
Non-Final Office Action dated Jul. 25, 2016 in U.S. Appl. No. 14/475,060. 18 pages.
Okabe et al., Office Action dated Sep. 5, 2016 in Japanese Patent Application No. 2016-518103. 11 pages.
First Examination Report dated Aug. 28, 2017 in German Patent Application No. 10 2015 209 22038. 18 pages.
Chinese Office Action dated Feb. 7, 2018 in CN201510282023.0. 21 pages (includes English translation).

* cited by examiner

SMS PROXYING

CROSS-REFERENCES TO RELATED APPLICATIONS

This application is a continuation of U.S. patent application Ser. No. 14/475,042, filed Sep. 2, 2014 (U.S. Patent Publication No. 2015/0350856 A1) entitled "SMS PROXYING," which claims priority to and the benefit of U.S. Provisional Application No. 62/005,336, filed May 30, 2014 entitled "SMS PROXYING," the entire disclosures of which are both hereby incorporated by reference for all purposes.

This application is also related to the following U.S. patent applications: U.S. application Ser. No. 14/475,458, filed Sep. 2, 2014 (U.S. Patent Publication No. 2015/0350418 A1) entitled "ANSWER AND HOLD WITH CLIENT AND HOST"; U.S. patent application Ser. No. 14/475,390, filed Sep. 2, 2014 (U.S. Patent Publication No. 2015/0350332 A1) entitled "ANSWERING A CALL WITH CLIENT THROUGH A HOST"; U.S. patent application Ser. No. 14/475,526, filed Sep. 2, 2014 (U.S. Patent Publication No. 2015/0350068 A1) entitled "CLIENT APPLICATIONS COMMUNICATING VIA A USER TUNNEL"; U.S. patent application Ser. No. 14/475,060, filed Sep. 2, 2014 (U.S. Patent Publication No. 2015/0350362 A1) entitled "PROXIED PUSH"; U.S. patent application Ser. No. 14/475,422, filed Sep. 2, 2014 (U.S. Patent Publication No. 2015/0350766 A1) entitled "MANAGING CONNECTIONS OF A USER DEVICE"; U.S. patent application Ser. No. 14/475,522 filed Sep. 2, 2014 (U.S. Patent Publication No. 2015/0349934 A1) entitled "APPLICATION-LEVEL ACKNOWLEDGEMENTS"; U.S. patent application Ser. No. 14/475,496 filed Sep. 2, 2014 (U.S. Patent Publication No. 2015/0349926 A1) entitled "MESSAGES WITH ATTENUATING RETRANSMIT IMPORTANCE"; U.S. Pat. No. 9,451,425 issued Sep. 20, 2016, entitled "UNIFIED MESSAGE DELIVERY BETWEEN PORTABLE ELECTRONIC DEVICES"; U.S. patent application Ser. No. 14/503,327, filed Sep. 30, 2014 (U.S. Patent Publication No. 2015/0350448 A1) entitled "USER INTERFACE FOR PHONE CALL ROUTING AMONG DEVICES"; U.S. patent application Ser. No. 14/475,437, filed Sep. 2, 2014 (U.S. Patent Publication No. 2015/0350813 A1) entitled "DYNAMIC TRANSPORT SWITCHING IN INTER-DEVICE COMMUNICATION"; and U.S. application Ser. No. 14/656,347, filed Mar. 12, 2015, entitled "DYNAMIC LINK ADAPTATION FOR IMPROVED LINK MARGIN" which are commonly owned and are hereby incorporated by reference for all purposes.

BACKGROUND

The present disclosure relates generally to communications between electronic devices and in particular to utilizing communication capabilities of proxy devices on behalf of proxied devices.

Electronic devices, such as computers, laptops, palmtops, mobile phones, smart phones, multimedia phones, portable media players, GPS units, mobile gaming systems, etc., have become quite popular. Many users carry a device almost everywhere they go. They also use their devices for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information).

Short Message Service (SMS) is a text messaging service component of phone, Web, or mobile communication systems. It uses standardized communications protocols to allow fixed line or mobile phone devices to exchange short text messages. SMS has been one the most widely used data application, with an estimated 3.5 billion active users, or about 80% of all mobile phone subscribers in studies. Though most SMS messages are mobile-to-mobile text messages, support for the service has expanded to include other mobile technologies, such as ANSI CDMA networks and Digital AMPS, as well as satellite and landline networks. Multimedia Messaging Service (MMS) is a standard way to send messages that include multimedia content to and from mobile phones. It extends the core SMS capability that allows the exchange of text messages only up to 160 characters in length. The most popular use is to send photographs from camera-equipped handsets, although it is also popular as a method of delivering news and entertainment content including music, videos, pictures, web pages, and other digital purchases.

Oftentimes, a user purchases a device for its primary function, such as purchasing smart phone to make phone calls rather than purchasing a tablet to make phone calls. Thus, more frequently users own multiple devices. The devices that a user owns can have a variety of overlapping and non-overlapping purposes. One problem is that users find it frustrating to have to switch their focus from one device to another device in order to use some specific capability of the latter device that the former lacks. Furthermore, some devices may include the hardware capability, but use of the hardware is not enabled or restricted in some manner—either through hardware or software means.

Accordingly, what is desired is to solve problems relating to coordinating and handling the delivery of SMS/MMS messages originating from devices that lack the hardware or capability to send the SMS/MMS message using cellular networks to devices capable of send the messages over cellular networks, some of which may be discussed herein. Additionally, what is desired is to reduce drawbacks relating extending the functionality and accessibility of devices that lack the hardware or capability to send SMS/MMS messages using cellular networks, some of which may be discussed herein.

BRIEF SUMMARY

A system and method are described for establishing two-way communication between devices that have a certain set of hardware and/or capabilities allowing the devices to send and receive SMS/MMS messages using cellular networks on behalf of devices that lack the hardware and/or capabilities. As it can be expensive or inefficient for a user to replace devices that lack a desired capability in order to acquire new devices that have the desired capability, or to have multiple devices that have the same capabilities, in various embodiments, devices (acting as proxied devices) lacking certain capabilities can utilize those capabilities present in other devices (acting as proxy devices).

In some embodiments, a user can register multiple devices each having different hardware and/or software capabilities under a unique user identifier. During registration, an identity management service can collect the hardware and/or software capabilities of the devices associated with the user. The collected capabilities of one of the user's devices can be distributed to another one of the user's devices. If a first device associated with a user lacks the device capability of another device associated with the user, the first device can query the identity management service for devices of the user that provide a desired device capability. The first device can interact directly or indirectly with the second device in order to have the second device perform operations using the desired device capability.

In one embodiment, a user's device lacking SMS/MMS capabilities queries an identity management service for device capabilities of other devices associated with the same user. The user's device lacking SMS/MMS capabilities can receive from the identity management service a device profile of each device associated with the user. The device profile can include one or more fields, flags, or indicators that specify or are otherwise indicative of hardware and/or software capabilities of a device. The user's device lacking SMS/MMS capabilities can select a device having SMS/MMS capabilities to act as a proxy based on a device's corresponding device profile that indicates that the device has SMS/MMS capabilities.

In some embodiments, a user's device lacking SMS/MMS capabilities can generate a message directed to a device having SMS/MMS capabilities that instructs the device having SMS/MMS capabilities to deliver a payload to a destination using the device's SMS/MMS capabilities. The user's device lacking SMS/MMS capabilities can send the message to a messaging service that delivers the message to the designated device that has SMS/MMS capabilities together with the instruction to send the payload to the destination using the device's SMS/MMS capabilities. A user interface of the device lacking SMS/MMS capabilities can display progress information through the process. In various embodiments, the device having SMS/MMS capabilities can send information indicative of the sending of the payload to the destination to any or all of the devices associated with the user.

Certain embodiments of the invention relate to communicating between a tablet lacking SMS/MMS capabilities (as a proxied device) and a smart phone having SMS/MMS capabilities (as a proxy device). For example, a tablet can establish a connection with an identity management service as a managed entity. The tablet can receive from the identity management service a set of device profiles that includes a device profile of the smart phone. The tablet can determine from the device profile of the smart phone that the smart phone has SMS/MMS capabilities. The tablet can choose any one of a variety of ways of generating a message or sending the message to the smart phone instructing the smart phone to deliver the message to a recipient as an SMS/MMS message. Accordingly, the SMS/MMS capabilities of the smart phone can be utilized by the tablet lacking SMS/MMS capabilities.

In some embodiments, a proxy device having SMS/MMS capabilities can receive a message sent from a proxied device lacking SMS/MMS capabilities. The proxy device can determine that the message is to be sent to a recipient using its SMS/MMS capabilities. The proxy device can connect to its wireless provider and send a SMS/MMS message to the recipient. If a reply SMS/MMS message is received from the recipient at the proxy device, the proxy device can send a message to at least the device lacking SMS/MMS capabilities allowing the reply message to appear in a user interface of the device lacking SMS/MMS capabilities. Prior to sending the reply message, the proxy device can determine a recipient of the message based at least in part on information associated with the message. The proxy device can determine whether delivery of the message to the recipient is restricted and/or whether the proxied device is authorized. In some embodiments, when the delivery of the message to the recipient is not restricted and the proxied device is authorized, the proxy device can transmit the message the proxied device or the recipient.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

I. Introduction

System and Methods are described for establishing two-way communication between devices that have a certain set of hardware and/or capabilities allowing the devices to send and receive SMS/MMS messages using cellular networks on behalf of devices that lack the hardware and/or capabilities. As it can be expensive or inefficient for a user to replace devices that lack a desired capability in order to acquire new devices that have the desired capability, or to have multiple devices that have the same capabilities, in various embodiments, devices (acting as proxied devices) lacking certain capabilities can utilize those capabilities present in other devices (acting as proxy devices).

A. System

Figure 1:
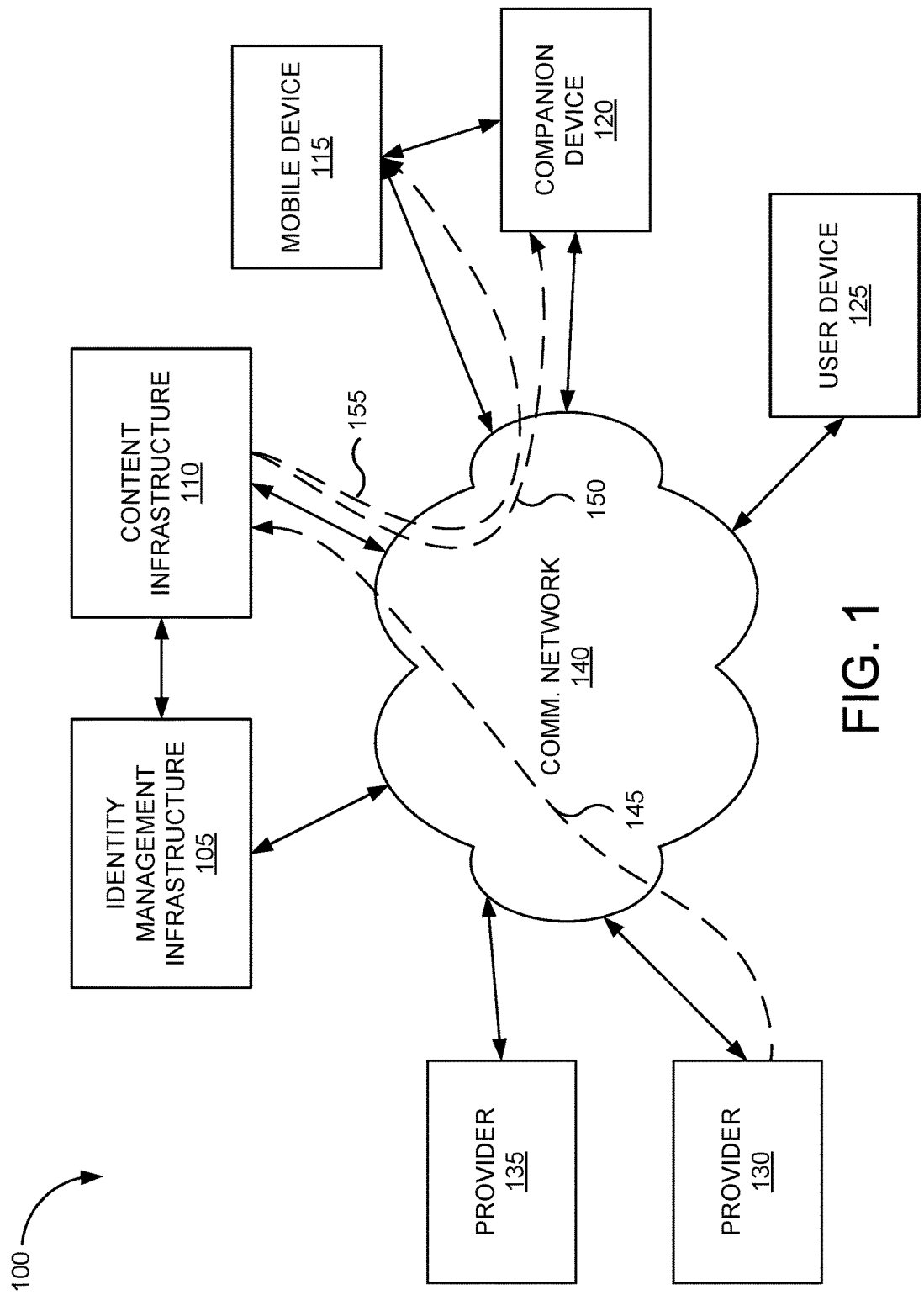
FIG. 1 is a block diagram of a device management and content delivery ecosystem according to various embodiments.

FIG. 1 is a block diagram of a device management and content delivery ecosystem 100 according to various embodiments. FIG. 1 and other figures are merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures. The devices in ecosystem 100 can include hardware and/or software elements.

In one embodiment, ecosystem 100 includes an identity management infrastructure 105, content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). Mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each of their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of ecosystem 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
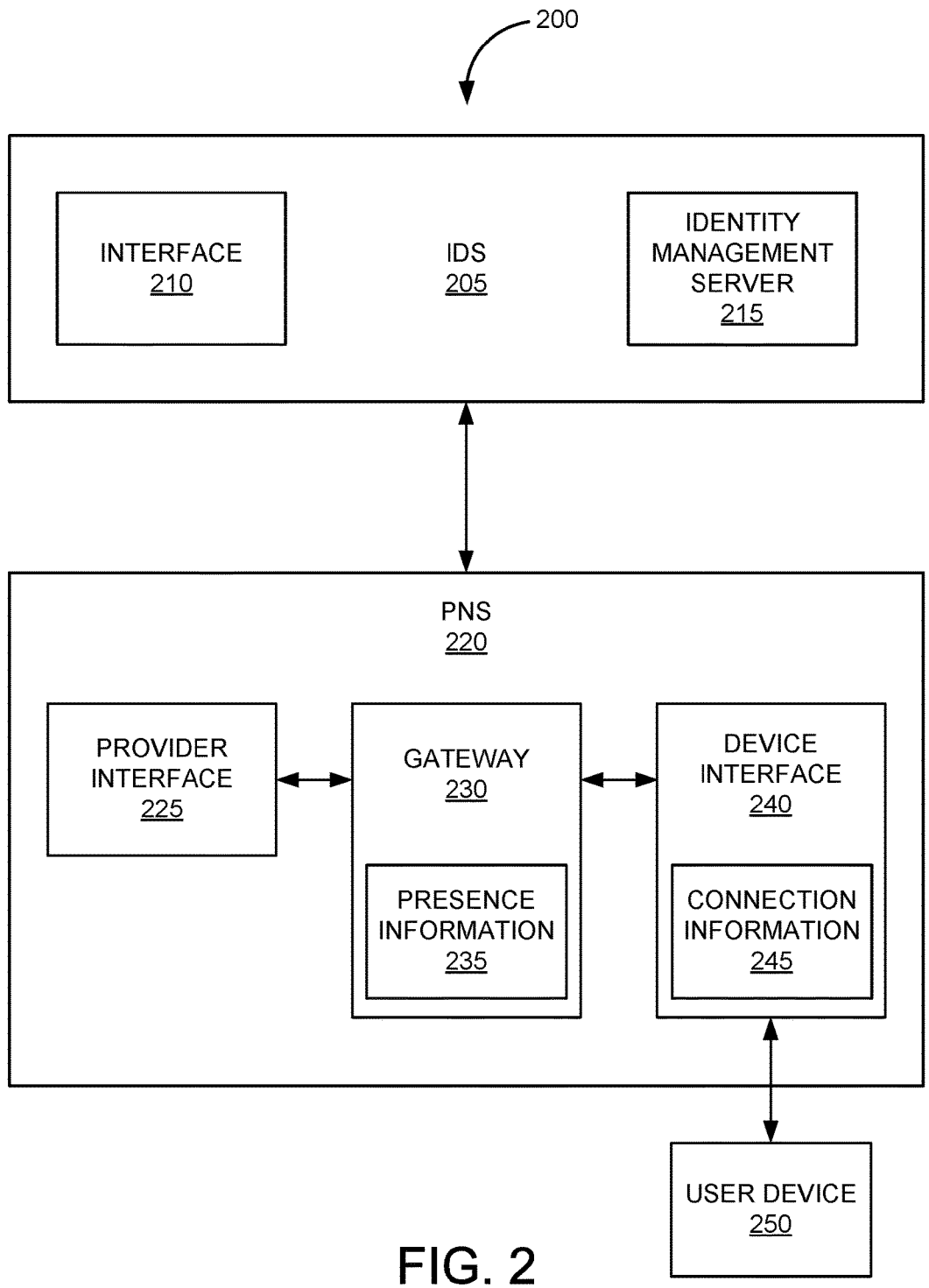
FIG. 2 is a block diagram of a content delivery system in the device management and content delivery ecosystem of FIG. 1 according to various embodiments.

FIG. 2 is a block diagram of content delivery system 200 that provides push notification services according to various embodiments. System 200 may be implemented in various embodiments using a single server computer system or may include multiple server computer systems, web servers, application servers, networks, interconnects, and the like. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215, and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or wi-fi signal, loss of power, or because a mobile device has changed geographic locations, etc. In other aspects, a connection may be intermittent as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 220) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. Proxied SMS

In various embodiments, SMS/MMS messages sent through non-SMS/MMS specific content delivery or messaging services (e.g., content infrastructure 110) can be forwarded to a proxy device connected to the service using profile information previously established by the proxy device. The proxy device is instructed to send and receive SMS/MMS messages on behalf of other proxied devices that are aware of the SMS/MMS capabilities of the proxy device. In some embodiments, the proxy device can maintain a master list of authorized device for which the proxy device will act as an intermediary. Accordingly, proxy devices act as intermediary devices in conjunction with non-SMS/MMS specific content delivery or messaging services to route SMS/MMS messages to and from proxied devices.

Figure 3:
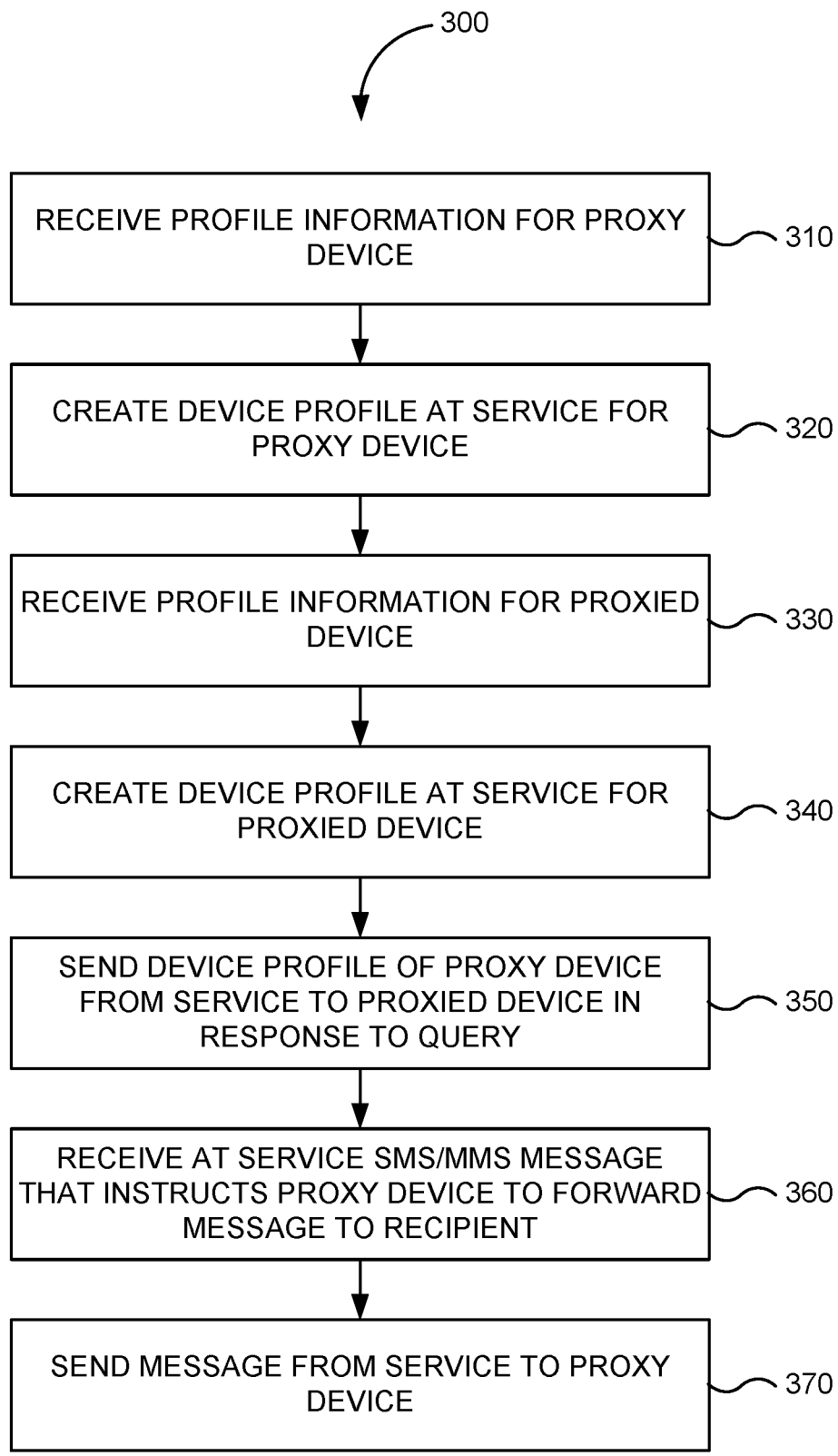
FIG. 3 is a flowchart of a method for performing proxied SMS/MMS messaging according to various embodiments.

FIG. 3 is a flowchart of method 300 for performing proxied SMS/MMS messaging according to various embodiments. Processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 310, profile information for a proxy device is received. The profile information can include a UID, certificate, token, and other information associated with or about hardware and/or software capabilities of the proxy device. The profile information can be received and stored at an identity management service (e.g., identity management infrastructure 105) through which the proxy device (e.g., companion device 120) is a managed entity. The proxy device can initiate a TLS connection with a server or other endpoint associated with the service in order to provide the profile information or otherwise have the profile information obtained at the service. The service can return its own server certificate that can be used by the proxy device to validate the service (or at least the server or endpoint) to ensure that the profile information is in trusted hands.

The proxy device can also sends its own device certificate to the service. The device certificate may be one issued when the proxy device registered or became a managed entity of the service, i.e., one returned by identity management server 215 during an initial registration of companion device 120 in order to become a managed entity. The service can validate the device certificate and if the validation is successful allow the proxy device to establish connections with other entities or services managed by the service. The service can also collect hardware and/or software capability information about the proxy device at the time of authentication.

In one embodiment, a successful registration that allows the proxy device to establish connections with other entities or services managed by the service instructs the proxy device to request authorization for other devices to use capabilities of the proxy device. A user of the proxy device can be prompted to authorize all, part, or none of a set of device registered with or otherwise associated with the user. A secured master list can be created that tracks devices that are authorized to utilize capabilities of the proxy device. In one aspect, the master list is maintained on the proxy device. The master list may be stored and maintained at other locations, such as at the service.

In step 320, a device profile for the proxy device is created at the service. A device profile can include a UID, token, or other identifier of the proxy device as well as one or more fields or attributes describing hardware and/or software capabilities of the proxy device. The device profile can be stored in a database or user/device directory associated with the service. In some embodiments, the device profile can be associated with a digital identity, user identifier, user profile, or other user information of the user of the proxy device.

In step 330, profile information for a proxied device is received. Similar to the process described above for the proxy device, the profile information for the proxied device can be stored at the service. In some embodiments, the service validates the device certificate of the proxied device. If the validation is successful, in step 340, a device profile for the proxied device is created at the service. The device profile can include a UID, token, or other identifier of the proxied device as well as one or more fields or attributes describing hardware and/or software capabilities of the proxied device. The device profile can be associated with a user profile of the user of the proxied device.

In various embodiments, device profiles associated with a user or other entity can be shared between devices of that user or entity for a variety of purposes. In some embodiments, successful registration that allows the proxied device to establish connections with other entities or services managed by the service instructs the proxy device to request authorization for the proxied device to use capabilities of the proxy device. A user of the proxy device can be prompted to authorize all, part, or none of a set of services or capabilities that the proxied device is able to use or otherwise access. Accordingly, the proxy device discussed above can send and receive SMS/MMS message on behalf of the proxied device using its own connection to a network that supports sending and receiving of SMS/MMS messages. The proxied device may be embodied as a wearable device, such as a smart watch or an optical head-mounted display (OHMD), a tablet, or other computing device that lacks traditional SMS/MMS messaging capabilities. In various embodiments, a user of both the proxied device and the proxy device is not required to pair the two devices in order to establish proxy communication. Each user device can be configured to contact the service to determine what other devices associated with the user or the user's profile have SMS/MMS messaging capabilities. The proxied device can then obtain the device profile of any devices having SMS/MMS messaging capabilities and have them act as proxy devices.

Referring again to FIG. 3, in step 350, the device profile of the proxy device is sent from the service to the proxied device in response to a query. In some embodiments, the service sends the device profile of the proxy device to the proxied device in response to periodic queries by the proxied device as users may add or remove devices from their accounts. In some embodiments, the service sends the device profile of the proxy device to the proxied device in response to the user the user authorizing the proxied device or having the proxied device added a master list of authorized devices for the proxied device. In some embodiments, the service sends the device profile of the proxy device to the proxied device in response to the user composing a message in a user interface of the proxied device allowing the user of the proxied device to explicitly designate which of a set of proxy device will be used.

In step 360, an SMS/MMS message is received at the service that instructs the proxy device to forward the message to a recipient. In some embodiments, the received message identifies the proxy device as a destination using a device token. The received message can include one or more recipients of an SMS/MMS message to be sent via the proxy device using its SMS/MMS capabilities. The received message can include a payload that specifies contents of the SMS/MMS message to be sent via the proxy device using its SMS/MMS capabilities to the one or more recipients. The received message can further include a flag or other indicator instructing the proxy device to send the SMS/MMS message using its SMS/MMS capabilities to the one or more recipients. In step 370, the message is sent from the service to the proxy device.

In some embodiments, the service may determine that the proxied device is not authorized to access or otherwise utilizes the services or capabilities of the proxy device. For example, the service can consult a master list of authorized devices for the proxy device. If the proxied device is not authorized, the service may perform one or more actions. The service may drop the message, reject the message with a notification to the proxied device, or forward the message to the proxy device requesting that the user of the proxy device authorize the proxied device.

A. Proxy/Proxied Device Management

Figure 4:
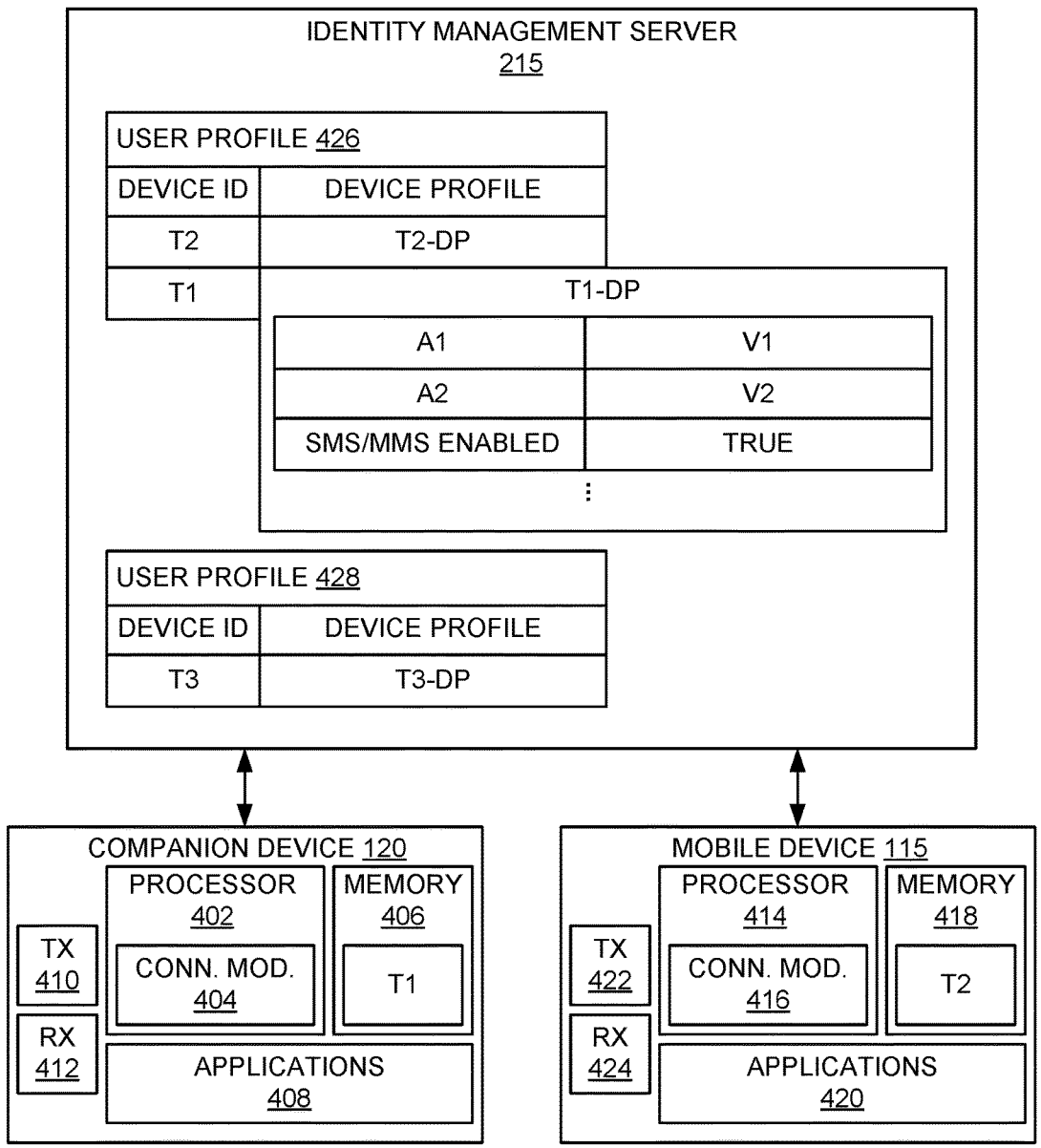
FIG. 4 is a block diagram illustrating how an identity management service manages device profiles according to one embodiment.

FIG. 4 is a block diagram illustrating how identity management server 215 manages device profiles according to one embodiment. In this example, companion device 120 includes processor 402 having connection module 404, memory 406 in which a UID, device token, or other identifier T1 is stored, one or more applications 408, transmitter 410, and receiver 412. Processor 402 includes connection module 404 for managing connections. Memory 406 stores device token T1. Upon initial connection with identity management server 215 at the request of one or more applications 408 in order to register companion device 120 with a user profile, connection module 404 can transmit using transmitter 410 registration information and receive device token T1 from identity management server 215 using receiver 412. Once device token T1 has been generated, transmitter 410 transmits, or sends, device token T1 to various services allowing those services to send content, messages, notifications, etc. to companion device 120. As discussed above, provider applications can use device token T1, or include the token, with any notification message so that it can be appropriately forwarded back to companion device 120.

Connection module 404 can manage the sending and receiving of SMS/MMS message using transmitter 410 and receiver 412 connected to a cellular network or other network that supports SMS/MMS messaging. Connection module 404 further can manage the sending and receiving of SMS/MMS message on behalf of mobile device 115. For example, connection module 404 can manage the delivery to a recipient of an SMS/MMS message generated by mobile device 115. Connection module 404 can manage the delivery to mobile device 115 using receiver 412 of reply of SMS/MMS messages or other SMS/MMS messages.

Mobile device 115 includes processor 414 having connection module 416, memory 418 in which device token T2 is stored, one or more applications 420, transmitter 422, and receiver 424. Processor 414 includes connection module 416 for managing connections. Memory 418 stores device token T2. Upon initial connection with identity management server 215 at the request of one or more applications 420 in order to register mobile device 115 with a user profile, connection module 416 can transmit using transmitter 422 registration information and receive device token T2 from identity management server 215 using receiver 424. Once device token T2 has been generated, transmitter 422 transmits, or sends, device token T2 to various provider applications.

Connection module 416 further can manage the sending to and receiving from companion device 120 of SMS/MMS messages or messages intended to be sent as SMS/MMS messages using the SMS/MMS capabilities of companion device 120. For example, connection module 416 can manage the forwarding of a message creating using a user interface of mobile device 115 using transmitter 422 to companion device 120. Connection module 416 may send the message directly or indirectly to companion device 120. In some embodiments, connection module 416 marks, labels, or otherwise flags such messages in a manner that instructs companion device 120 upon receiving the messages to deliver the messages to the intended recipients using its SMS/MMS capabilities.

In this example, a message associated with companion device 120 is received at identity management server 215 in order to register or otherwise associate companion device 120 with a user or user's profile. Identity management server 215 includes user profile 426 and user profile 428. In these embodiments, FIG. 4 illustrates that user profile 426 includes or is otherwise associated with a set of device identifiers and a set of device profiles. Each device identifier in the set is mapped or otherwise has a corresponding device profile. Specifically, for user profile 426, a device identifier as represented by device token T1 is mapped, correlated, or otherwise in correspondence with a device profile as represented by T1-DP. A device identifier as represented by device token T1 is mapped, correlated, or otherwise in correspondence with a device profile as represented by T2-DP. For user profile 428, a device identifier as represented by token T3 is mapped with a device profile as represented by T3-DP. Although depicted with respect to device tokens, alternative device identifiers as discussed herein can be used.

In these embodiments, FIG. 4 illustrates that user profile 426 includes a device identifier as represented by token T1 is mapped, correlated, or otherwise in correspondence with device profile T1-D1 that includes a set of attributes and a set of values. Attribute A1 is paired with value V1. Attribute A2 is paired with value V2. An SMS/MMS enabled attribute is paired with a value of "TRUE." Accordingly, device profile T1-DP can include a variety of attributes that specify capabilities or aspects related to users, organizations, hardware, and/or software that are to be attributed to a device having device token T1.

Figure 5:
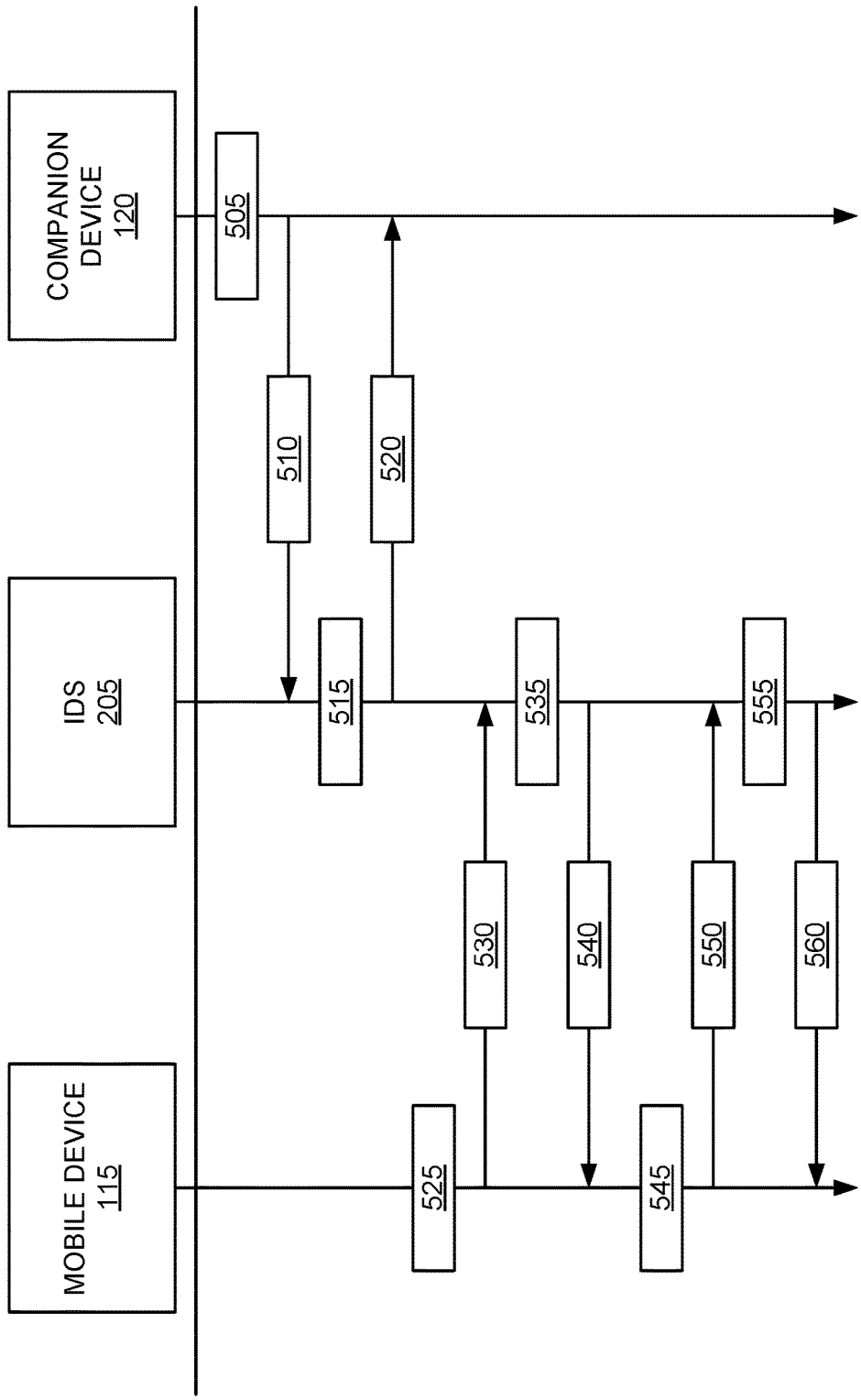
FIG. 5 is a message sequence chart that illustrates establishment of proxy and proxied capabilities for SMS/MMS proxying according to various embodiments.

FIG. 5 is a message sequence chart that illustrates establishment of proxy and proxied capabilities for SMS/MMS proxying according to various embodiments. In these examples, to establish a device capabilities, companion device 120 of FIG. 2 acting on its own or as a proxy device generates at the very least a presence command for device token T1 (or when sent without a device token, device token T1 can be generated) at 505. The presence command can include capabilities of companion device 120. In further embodiments, the presence command can include information identifying one or more devices authorized to use the capabilities of companion device 120. At 510, companion device 120 sends the presence command to IDS 205.

Data passed to IDS 205 in the presence command for device token T1 can be validated using a variety of pre-specified criteria at 515. When everything is successfully validated, IDS 205 generates device profile for device token T1 describing at least the capabilities of companion device 120. The device profile can include capability information obtained from companion device 120 or information learned about companion device 120 from IDS 205 or other sources. In some embodiments, the device profile includes information associated with a user of companion device 120. In further embodiments, the device profile can be associated with or otherwise include information identifying one or more devices authorized to use the capabilities of companion device 120. At 520, IDS 205 sends status OK back (along with a new generated token if no token was provided). If validation fails for some reason, IDS 205 can send a connected with status invalid back to companion device 120 at 520.

After a successful exchange asserting the presence command for device token T1, companion device 120 can begin acting as a proxy device thereby sending and receiving SMS/MMS messages for proxied devices. To establish proxied presence, mobile device 115 similarly generates a presence command for device token T2 at 525. At 530, mobile device 115 sends the presence command for device token T2 to IDS 205.

At 535, data passed to IDS 205 in the presence command for device token T2 is validated similarly as described above. If validation fails for some reason, IDS 205 can send a connected with status invalid back to mobile device 115 at 540. When everything is successfully validated, IDS 205 can send status OK back (along with a new generated token if no token was provided) at 540. IDS 205 can at this point also send the device profile for companion device 120 describing capabilities of companion device 120. A determination can be made whether mobile device 115 is an authorized device. If mobile device 115 is determined to not be an authorized device, IDS 205 can restrict delivery of the device profile for companion device 120 describing capabilities of companion device 120 to mobile device 115.

In some embodiments, mobile device 115 generates a device profile query command at 545. At 550, mobile device 115 sends the device profile query command to IDS 205. At 555, data passed to IDS 205 in the device token profile command is validated, for example to determine whether mobile device 115 or a user of mobile device 115 can access requested device profiles. If validation fails for some reason, IDS 205 can send a connected with status invalid back to mobile device 115 at 560. When everything is successfully validated, IDS 205 can send status OK back (along with any requested device profiles) at 560.

B. Forward Push—Sending SMS/MMS Messages to Proxy Device

Figure 6:
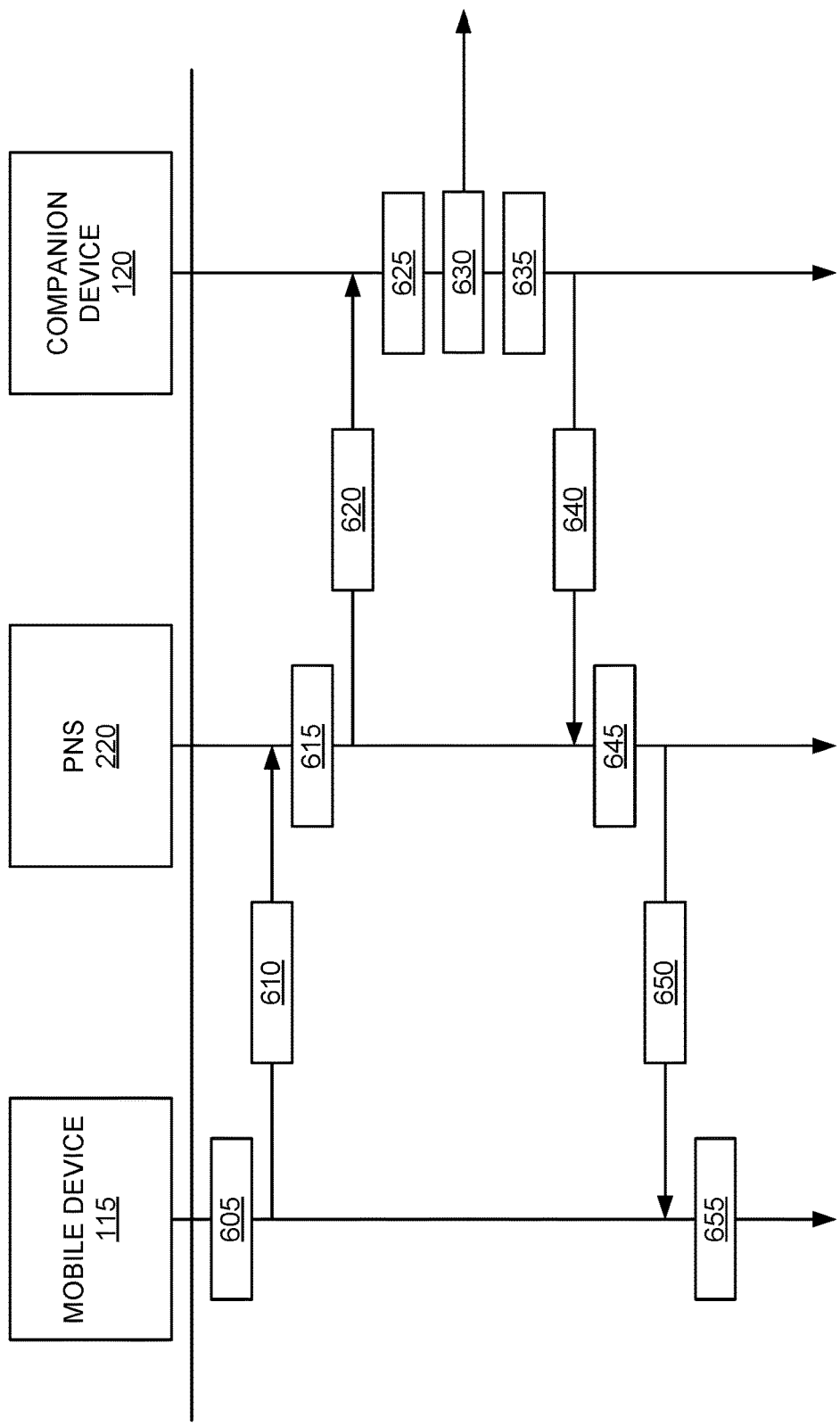
FIG. 6 is a message sequence chart that illustrates an overview of SMS/MMS proxying according to various embodiments.

FIG. 6 is a message sequence chart that illustrates an overview of SMS/MMS proxying according to various embodiments. In these examples, a proxied device (e.g., mobile device 115) generates a message to be sent to one or more recipients using the SMS/MMS capabilities of a proxy device (e.g., companion device 120) at 605. The message can include a payload to be communicated using the SMS/MMS capabilities of the proxy device and one or more recipients. The message can further include a flag or other indicator that instructs the proxy device to send the payload to the one or more recipients using its SMS/MMS capabilities. At 610, the message is sent to a service, such as a content delivery service (e.g., PNS 220) or a messaging service.

At 615, the service receives the message from the proxied device and determines the destination of the message. In some embodiments, the service determines the proxy device as the destination at least as far as the service is concerned based on a device token associated with the proxy device included with or in the message by the proxied device according to the device profile of the proxy device. At 620, the service sends the message to the proxy device. In some embodiments, the service can send a copy of the message to other devices registered to the user of the proxy device. The service may send a copy of the message only to those devices authorized to use or otherwise access the specified capabilities of the proxy device.

At 625, the proxy device receives the message and determines whether it is the intended destination and/or recipient. The proxy device can determine that it is the intended destination but not the intended recipient. The proxy device can identify that message includes the flag or other indication that the proxy device should send a payload of the message to one or more recipients using its SMS/MMS capabilities. In some embodiments, the proxy device determines whether the originator of the message (i.e., the proxied device) is authorized to utilize capabilities of the proxy device. If the proxy device should forward the message and the proxied device is authorized, the proxy device sends an SMS/MMS message generated based on the message (e.g., its payload) to the one or more recipients utilizing its SMS/MMS capabilities at 630.

In some embodiments, the proxy device can determine the status of sending the SMS/MMS message to the one or more recipients. At 635, the proxy device generates and acknowledgment or other message and sends the message to the service indicating to the proxied device that the SMS/MMS message has been sent. At 645, the service receives the message from the proxy device and determines the destination of the message. At 650, the service sends the message to the proxied device. At 655, the proxied device receives the message. The proxied device can update its user interface to indicate the status of the SMS/MMS message.

As discussed above, in some embodiments, the service and/or the proxy device can send a copy of the message or the message status information to other devices registered to the user of the proxy device. The service may send a copy of the message or message status information only to those devices authorized to use or otherwise access the specified capabilities of the proxy device.

Figure 7:
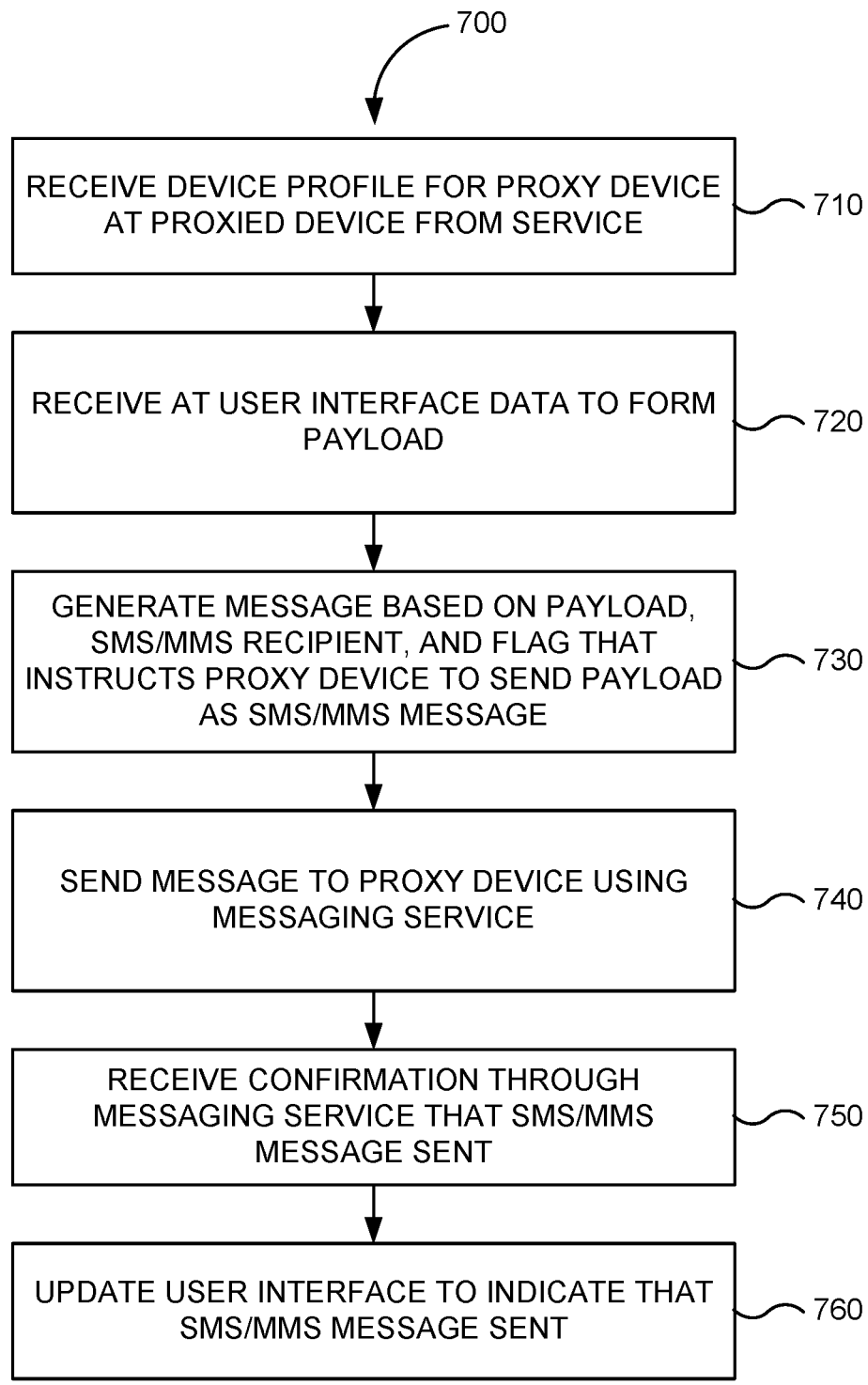
FIG. 7 is a flowchart of a method performed by a proxied device lacking SMS/MMS capabilities for delivering SMS/MMS messages to a proxy device having SMS/MMS capabilities according to one embodiment.

FIG. 7 is a flowchart of a method performed by a proxied device lacking SMS/MMS capabilities for delivering SMS/MMS messages to a proxy device having SMS/MMS capabilities according to one embodiment. Processing in method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 710, a device profile for a proxy device (e.g., companion device 120) is received at a proxied device (e.g., mobile device 115) from a service (e.g., IDS 205). The device profile can include a device identifier. The device identifier can be used to send messages to the proxy device. The device profile can further include hardware and/or software capabilities of the proxy device as discussed above.

In step 720, data is received at a user interface of the proxied device to form a payload. The payload can include data intended to be sent as an SMS/MMS message using SMS/MMS capabilities of the proxy device. The payload can be embodied as a plain text message, a chat message, or other electronic message in a variety of formats. In step 730, a message is generated at the proxied device based on the payload, at least one SMS/MMS recipient (e.g., a telephone number or contact identifier), and a flag or other indicator that instructs the proxy device to send the payload to any designated recipients using its SMS/MMS capabilities.

In step 740, the message is sent to the proxy device using a content delivery service or a messaging service. In some embodiments, the message can be in the form of a message command. The message command can identify the type of message as a carrier message, the destination of the carrier message (i.e., a device or app token), and/or a payload. The recipient of the SMS/MMS message can be identified in the carrier message or in the payload. In contrast to traditional proxy techniques were entities that lack SMS/MMS capabilities are required to use a gateway not under their control or other third party service provider in order to proxy messages to and from devices that lack SMS/MMS capabilities, embodiments facilitate the discovery of a user's own devices that have the appropriate capabilities to send and receive SMS/MMS messages such that devices lacking those capabilities can make use of the user's own device. Furthermore, embodiments allow a user the flexibility to use any messaging service through which both the proxy and the proxy device can communicate.

In various embodiments, the proxied device can optionally in step 740 send the message or a copy thereof to other devices associated with the user instructing the other devices to update their user interfaces or message repositories with the message being sent. This can provide consistency across all devices of a user as the outbox or sent items folder of a messaging application can be updated no matter which device sent the message. Furthermore, each of the user's other devices can display a sending notification or status until an update is received from the proxy or proxied device.

In step 750, a confirmation is received through the service that the SMS/MMS message was sent. In step 760, the user interface of the proxied device is updated to indicate that the SMS/MMS message was sent. As alluded to above, each device of a user can be instructed to update their user interface or message repositories with a confirmation that the message was delivered to its intended recipient. This can involve moving outbox items to sent mail folders, updating user interface widgets, sending notifications, or the like.

Figure 8:
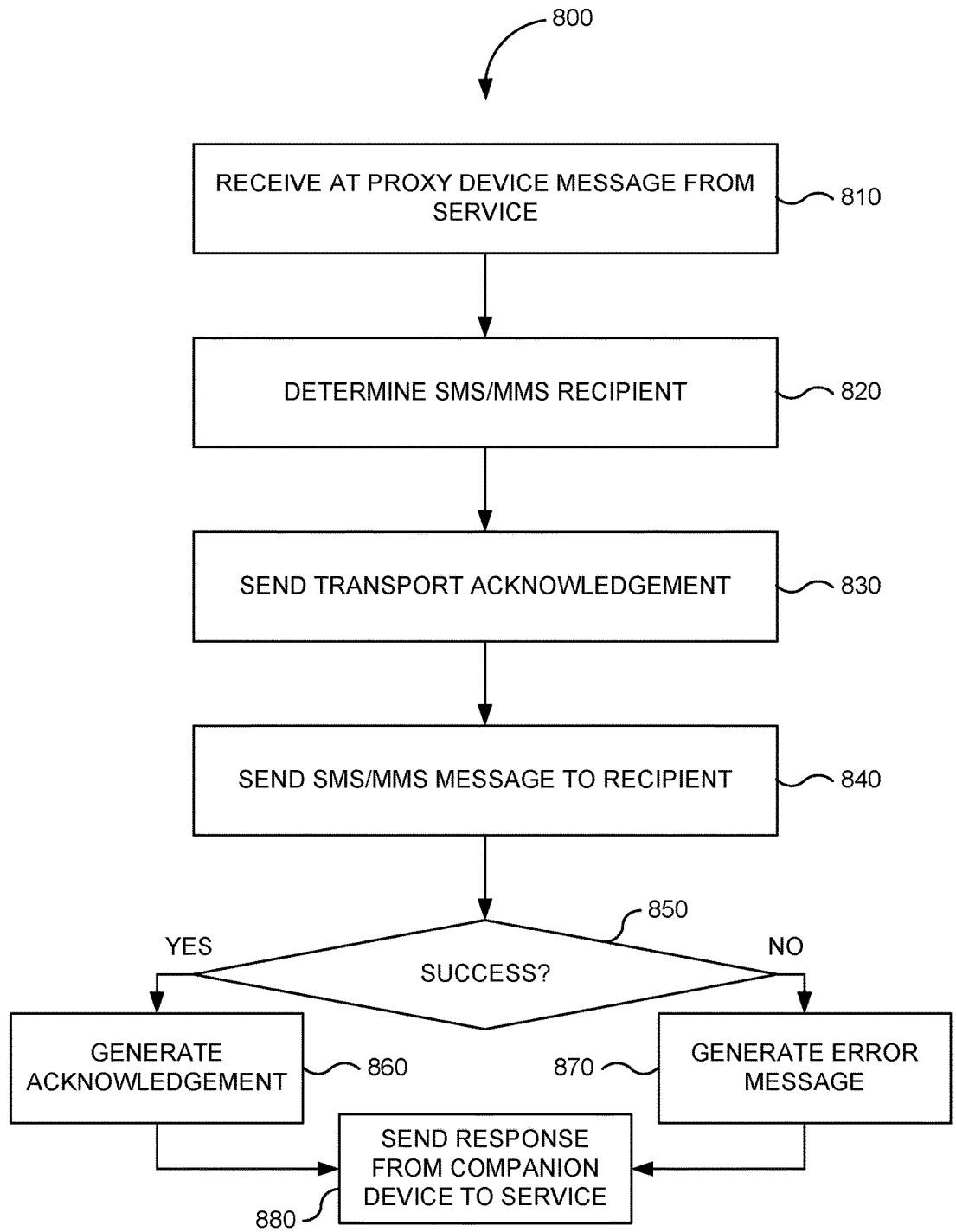
FIG. 8 is a flowchart of a method performed by a proxy device having SMS/MMS capabilities for handing SMS/MMS messages on behalf of proxied devices that lack SMS/MMS capabilities according to one embodiment.

FIG. 8 is a flowchart of a method performed by a proxy device having SMS/MMS capabilities for handing SMS/MMS messages on behalf of proxied devices that lack SMS/MMS capabilities according to one embodiment. Processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 810, a message is received at a proxy device (e.g., companion device 120) from a content delivery service or a messaging service. The message can be received via a persistent connection the proxy device maintains with the service. In step 820, the proxy device determines an SMS/MMS recipient. In various embodiments, the messaging service can send a specifically crafted message to the proxy device instructing the proxy device to send an SMS/MMS message to one or more recipients. The message can have a specific topic that identifies it to the proxy device as one to be sent to one or more recipients using its SMS/MMS capabilities. In some embodiments, the messaging service can merely be a transport relaying messages crafted in its native format. The proxied device and/or the proxy device can determine how to indicate whether a payload of a message should be sent as an SMS/MMS message.

In some embodiments, steps 810 and/or 820 can include one or more security checks. For example, the proxy device can determine whether the proxied device is authorized to utilize capabilities of the proxy device. The proxy device may maintain a secure master list of authorized devices and consult the list in response to receiving messages. The proxy device can further determine whether delivery of messages to the intended recipient is restricted. Restrictions may be based on identity of the intended recipient and/or the contents or subject matter of the message.

If the proxied device is authorized and delivery is not restricted to the intended recipient, for example, a transport acknowledgment is sent to the service from the proxy device in step 830. The transport command can indicate to the service that the proxy device has received the message and is in the process of attempting delivery to the intended SMS/MMS recipient. The system may relay a notification to the proxied device (or other devices associated with the user) allowing the user interface to display message status information.

In step 840, an SMS/MMS message is sent to recipient using the proxy device. The SMS/MMS message can be sent to one or more recipients using the proxy device's connection to a wireless cellular provider, mobile phone provider, Internet SMS/MMS provider, or the like. In step 850, an optional determination is made whether the SMS/MMS was sent successfully. For example, the proxy device can request a delivery report when sending the SMS/MMS message. For best efforts delivery, the act of sending the SMS/MMS message can be construed as a success.

Based on a determination in step 850 that the SMS/MMS was sent successfully, an acknowledgement is generated in step 860. Based on a determination in step 850 that the SMS/MMS was not sent successfully, an error message is generated in step 870. In step 880, a response is sent from the companion device to the service. The response can include either the acknowledgment generated in step 860 or the error message generated in step 870. In various embodiments, the response can be propagated using the service to the proxied device or other interested or authorized devices of the user.

C. Reply Push—Sending SMS/MMS Messages to Proxied Devices

Figure 9:
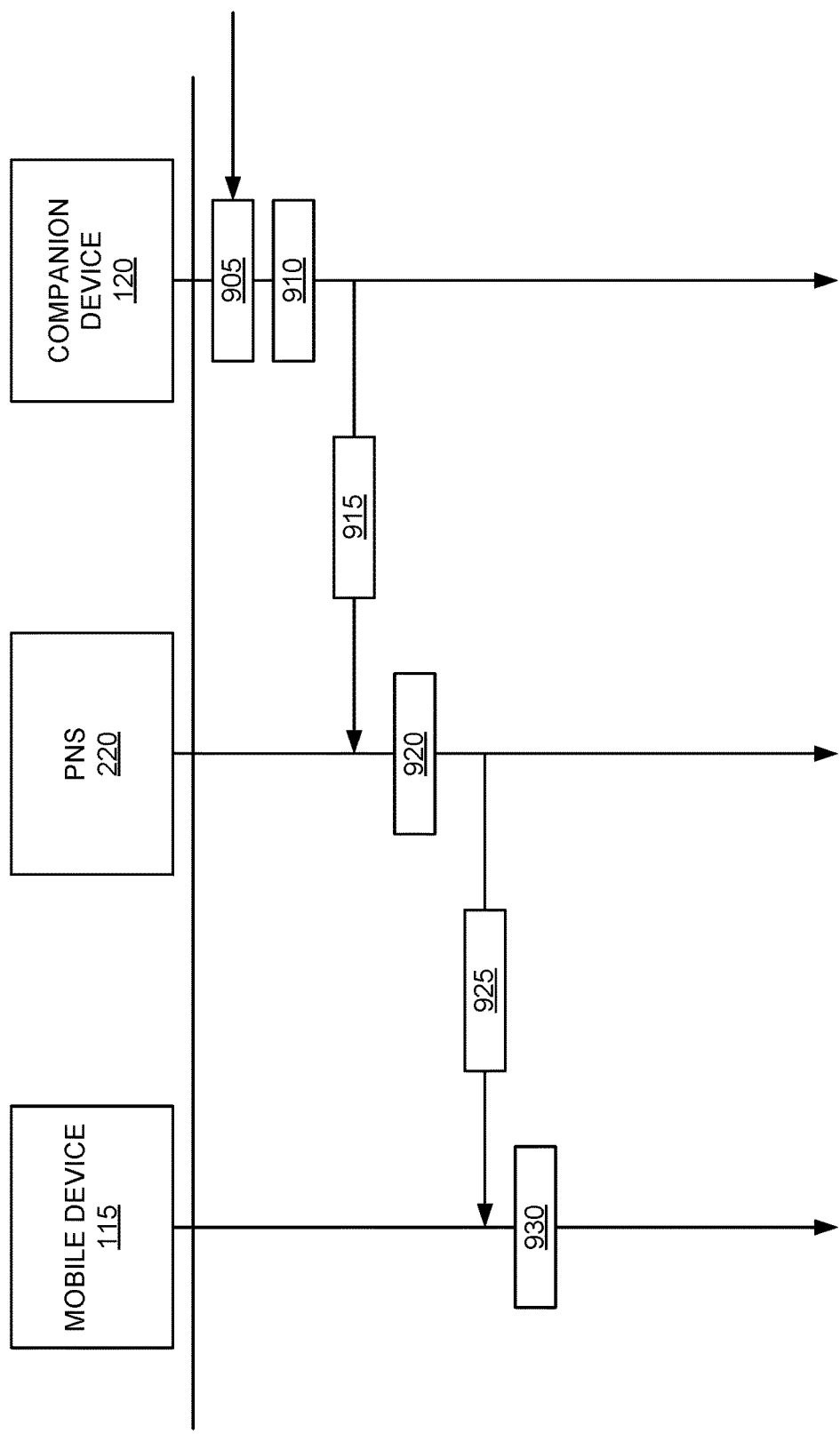
FIG. 9 is a message sequence chart illustrating sending reply SMS/MMS messages delivered to proxy devices having SMS/MMS capabilities to proxied devices lacking SMS/MMS capabilities according to one embodiment.

FIG. 9 is a message sequence chart illustrating sending reply SMS/MMS messages delivered to proxy devices having SMS/MMS capabilities to proxied devices lacking SMS/MMS capabilities according to one embodiment. In these examples, a proxy device (e.g., companion device 120) receives an SMS/MMS message using its SMS/MMS capabilities at 905. At 910, the proxy device determines whether the SMS/MMS message should be propagated to other user devices. This determination can be made based on the proxy device acting as a proxy from previous messages sent from authorized devices maintained on a master list or based on user preferences associated with each device. If the proxy device determines that the SMS/MMS message should be propagated to other user devices, a message is generated at 910. At 915, the message is sent to a service, such as a content delivery service (e.g., PNS 220) or a messaging service.

At 920, the service receives the message from the proxy device and determines the destination of the message. In some embodiments, the service determines a proxied device (e.g., mobile device 115) as the destination at least as far as the service is concerned based on a device token associated with the proxied device included with or in the message by the proxy device according to the device profile of the proxied device. At 925, the service sends the message to the proxied device.

At 930, the proxied device receives the message and determines whether it is the intended destination and/or recipient. If so, the proxied device processes the message. For example, the proxied device can update its user interface or message repository with the SMS/MMS message.

III. Communication Stack on Mobile Device

The communication of data from a device (e.g., mobile device 115 or companion device 120) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

Figure 10:
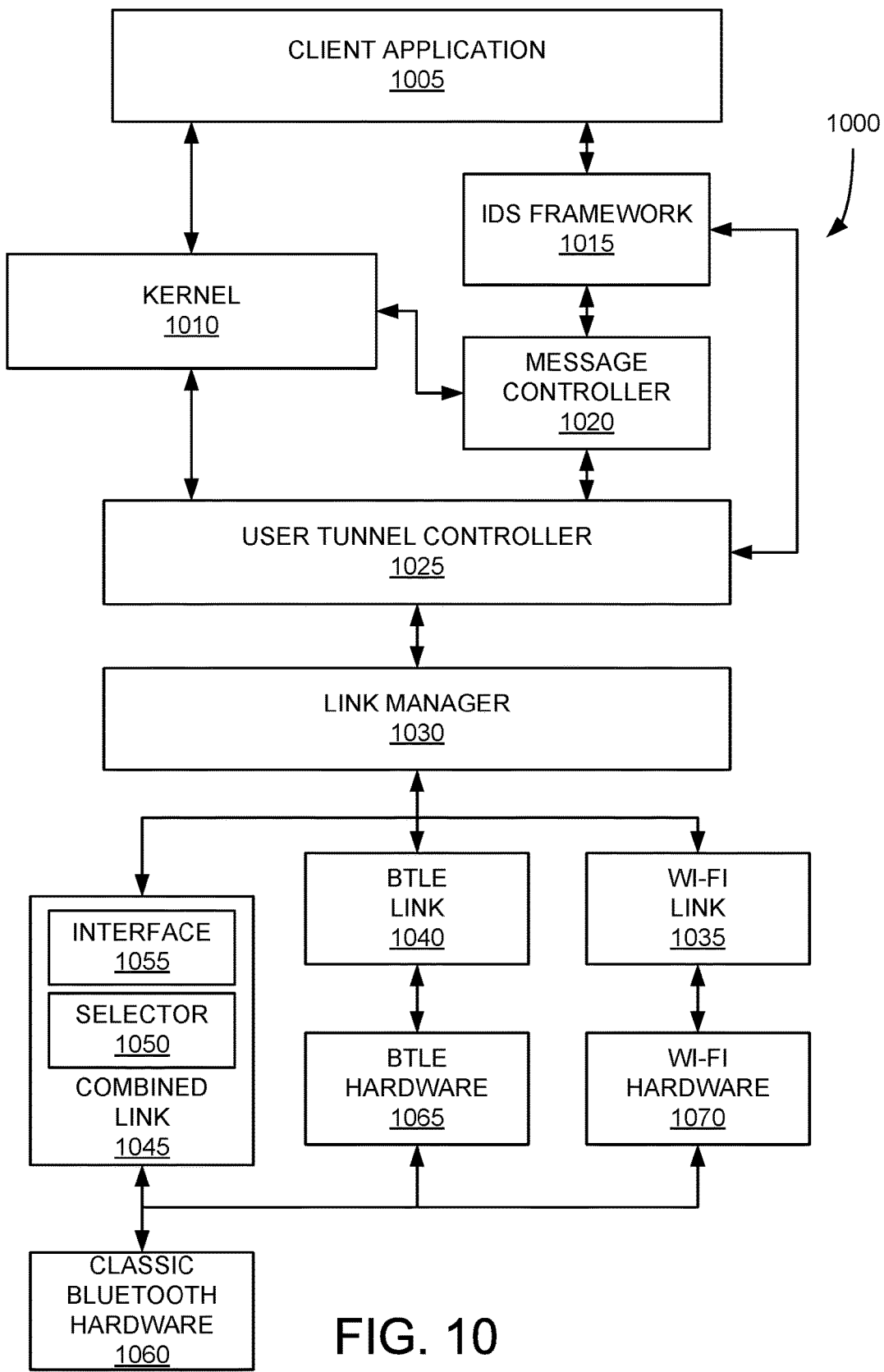
FIG. 10 shows a protocol stack for communicating data according to embodiments of the present invention.

FIG. 10 shows a protocol stack 1000 for communicating data according to embodiments of the present invention. Various modules in protocol stack 1000 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 1005 on the device (e.g., mobile device 105) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent using any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 1005 can submit an open socket request (e.g., in a streaming example). The socket request can use information from an identity services (IDS) framework 1015, which can provide an address (or other type of ID) for the other device. For example, client application 1005 can know account information for the second device (e.g., account information of a different or same user), and IDS framework 1015 can store a list of device IDs for a particular account. IDS framework 1015 can be in communication with identity management infrastructure 105 to obtain the list. Thus, IDS framework 1015 can store or otherwise obtain device IDs (e.g., addresses) for all devices that a user has registered with identity management infrastructure 105. For example, IDS framework 1015 can request via an IDS daemon to identity management infrastructure 105 to obtain the device IDs. In one implementation, the socket request can be made to kernel 1010.

In a messaging example, the request to send data can go to IDS framework 1015 to obtain a device ID, which can be sent to message controller 1020 and a user tunnel (UTUN) controller 1025. UTUN controller 1025 can establish a mapping between the device ID and an IP address (e.g., a virtual IP address) when the device ID is not an IP address. A socket can be created between message controller 1020 (which assigns a device ID to the socket) and kernel 1010 (which can assigns an address to the socket, such as a virtual IP address). UTUN controller 1025 can be used to create the socket connection between message controller 1020 and kernel 1010. In this manner, the send-date request from client application 1005 does not need to include a device ID, but can specify an account, which can then be cross-referenced by IDS framework 1015 with known devices of the account and their capabilities (e.g., if the request requires certain capabilities). Given that a device ID can be obtained, a pairing does not need to occur prior to creating the socket.

In various embodiments, IDS framework 1015 can receive a particular port/service at the other device from client application 1005, determine the port/service based on information obtained from identity management infrastructure 105, or determine the port/service from a token sent in the request. IDS framework 1015 can then communicate a device ID and other header information to message controller 1020 and/or UTUN controller 1025. IDS framework

1015 and UTUN controller 1025 can communicate via cross process communication (XPC). UTUN controller 1025 can be part of an IDS daemon, and can receive a device ID from identity management infrastructure 105.

As mentioned above, UTUN controller 1025 can create a virtual address that corresponds to the actual device address, where the virtual address can be used to create a virtual socket. A virtual socket can also be created using any device ID (e.g., an actual address of a device or other ID). As an example, a socket can be created for communication between client application 1005 and kernel 1010 (e.g., in a streaming context), where kernel 1010 can have various sockets open with various client applications. Kernel 1010 can have a single connection to UTUN controller 1025 for the other device and multiplex (mux) the data from various client applications into the single connection. Instead or in addition, UTUN controller 1025 can also perform the muxing, e.g., if multiple socket exist between kernel 1010 and UTUN controller 1025 for various client applications to the other device. Incoming data can be demultiplexed (de-muxed) for sending to the destination client application.

As another example, a socket can be created between kernel 1010 and message controller 1020 (e.g., in a messaging context), where a socket can be created for each destination device, with different sockets to a same device potentially having different priorities. Thus, a particular virtual socket can be associated with a particular device and a particular priority (e.g., high and low). Message controller 1020 can have various connections to various client applications. Thus, message controller 1020 can provide mux/demux capabilities.

UTUN controller can create a primary socket with the other device. When UTUN controller 1025 receives data using a virtual connection associated with the second device, it can then map the virtual connection to the primary socket for communicating with the other device. All data for the other device can then be sent out through the primary socket. The virtual address for a virtual socket can be passed back to client application, e.g., in the stream context. In one embodiment, a virtual socket involving kernel 1010 is a TCP socket. The virtual address can have a same format as a regular address, e.g., an IPv6 address. A mux module can include any combination of kernel 1010, message controller 1020, and UTUN controller 1025.

When client application 1005 sends data, client application 1005 can use the virtual socket to send data to kernel 1010. For example, the data can be sent using TCP via the virtual socket. Kernel 1010 can implement an UTUN interface for communicating with UTUN controller 1025. Kernel 1010 would pass the data (e.g., with a TCP header) and the virtual socket identifying the virtual address to UTUN controller 1025, which would then use the virtual address to resolve the device address for determining the device socket.

When sending to the data over the device socket, a link manager 1030 can determine which link to use. A link can be a particular combination of a wireless interface protocol (e.g., Bluetooth or Wi-Fi), a transport protocol (e.g., TCP, UDP, etc), and a destination device. In this manner, UTUN controller 1025 does not need to know how the data is being sent, but instead can simply send the data to link manager 1030.

In various embodiments, the determination by link manager 1030 can be made per data packet, per set of data packets, per device socket, and may change from one data packet to another. Link manager 1030 may then select a link for sending the data. In the example shown, a Wi-Fi link 1035 provides software drivers for communicating with one or more Wi-Fi protocols, and BLTE link 1040 provides software drivers for communicating with Blutooth LE. Wi-Fi link 1035 is in communication with Wi-Fi hardware 1070, and BLTE link 1040 is in communication with BTLE hardware 1065. Wi-Fi link 1035 can be used for various Wi-Fi protocols, such as infra-WiFi (infrastructure WiFi). In one embodiment, link manager 1030 can try all links to determine whether any of the links can contact the other device, and then use a connected link with a highest predetermined rank or dynamic rank.

Hardware 1065-1170 can be in communication with links assigned to various devices. For example, links 1035, 1040, and 1045 can be assigned for communication with a second device. And, other links that are assigned for communication with a third device can also be in communication with hardware 1065-1170. When a particular hardware receives data, software can identify a particular sending device and then determine the corresponding link, e.g., using header information to determine the link corresponding to the sending device and transport protocol.

In some embodiments, a combined link 1045 can include an interface 1055 for communicating with link manager 1030 and a selector 1050 that selects a particular protocol to use. The protocols can be the same or different than that available to link manager 1030. Selector 1050 can perform similar functions as link manager 1030 in that a particular link is selected. However, link manager 1030 and selector 1050 can use different criteria for determining which link to use. For example, link manager 1030 can determine to use combined link 1045, and selector 1050 can then determine that BTLE hardware 1065 is to be used. The hardware can be contained on a same or separate chips.

One or more protocols can be only available via combined link 1045, such as classic Bluetooth hardware. Link manager 1030 and selector 1050 can use various criteria for determining which link to use, such as power usage of a link, speed of a link (e.g., real-time data rate), and signal strength of a link. A goal of the optimization for selecting a link can be to provide a minimal data rate at a lowest possible energy.

IV. Mobile Device

Figure 11:
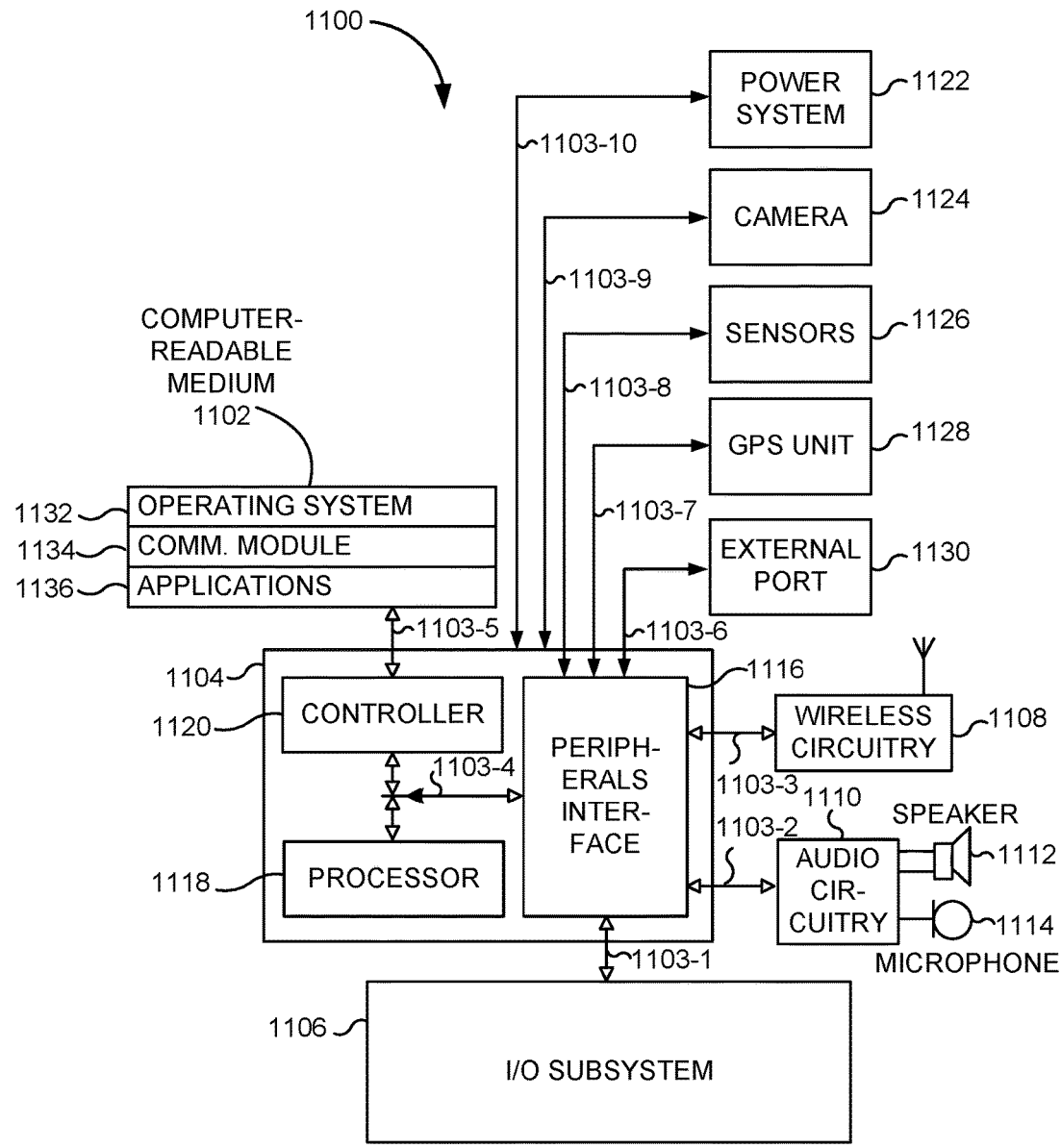
FIG. 11 is a block diagram of a portable electronic device or mobile device according to an embodiment

FIG. 11 is a block diagram of a portable electronic device or mobile device 1100 according to an embodiment. Mobile device 1100 generally includes computer-readable medium 1102, a processing system 1104, an Input/Output (I/O) subsystem 1106, wireless circuitry 1108, and audio circuitry 1110 including speaker 1112 and microphone 1114. These components may be coupled by one or more communication buses or signal lines 1103. Mobile device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 11 is only one example of an architecture for mobile device 1100, and that mobile device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 1108 is coupled to processing system 1104 via peripherals interface 1116. Interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats.

Peripherals interface 1116 couple the input and output peripherals of device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Medium 1102 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1116, one or more processors 1118, and memory controller 1120 can be implemented on a single chip, such as processing system 1104. In some other embodiments, they can be implemented on separate chips.

Mobile device 1100 also includes a power system 1122 for powering the various hardware components. Power system 1122 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1100 includes a camera 1124. In some embodiments, mobile device 1100 includes sensors 1126. Sensors can include accelerometers, compass, gyrometer, pressure sensors, audio sensors, light sensors, barometers, and the like. Sensors 1126 can be used to sense location aspects, such as auditory or light signatures of a location. In some embodiments, mobile device 1100 can include a GPS receiver, sometimes referred to as a GPS unit 1128. A mobile device can use a satellite navigation system, such as the Global Positioning System (GPS), to obtain position information, timing information, altitude, or other navigation information. In some embodiments, mobile device 1100 can include external port 1130 (e.g., USB, FireWire, Lightning connector, 30-pin connector, etc.). External port 1130 can be adapted for coupling directly to other devices or indirectly over a network (e.g., the Internet, wireless LAN, etc.).

One or more processors 1118 run various software components stored in medium 1102 to perform various functions for device 1100. In some embodiments, the software components include operating system 1132, communication module (or set of instructions) 1134, and other applications (or set of instructions) 1136. Operating system 1132 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1134 facilitates communication with other devices over one or more external ports 1130 or via wireless circuitry 1108 and includes various software components for handling data received from wireless circuitry 1108 and/or external port 1130.

The one or more applications 1136 on mobile device 1100 can include any applications installed on the device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method performed by a proxy host device, the method comprising:
   receiving a message from a service provider;
   determining a recipient for the message based at least in part on an item of information associated with the message, the recipient being a user associated with the proxy host device and a proxied client device;
   determining whether delivery of the message to the proxy host device or the proxied client device is restricted based at least in part on content of the message;
   determining whether the proxy host device has been designated by the user, via input received at a user interface of the proxied client device, for the proxied client device to utilize messaging capabilities of the proxy host device; and
   when the delivery of the message is not restricted and the proxy host device is designated for the proxied client device to utilize the messaging capabilities of the proxy host device, transmitting the message to the proxied client device.

2. The method of claim 1, wherein the message comprises a short messaging service (SMS) message or a multimedia messaging service (MMS) message.

3. The method of claim 1, wherein the messaging capabilities of the proxy host device comprise sending short messaging service (SMS) messages to the service provider or receiving SMS messages from the service provider.

4. The method of claim 3, wherein the proxied client device is not capable of performing the messaging capabilities of the proxy host device.

5. The method of claim 1, wherein the item of information associated with the message comprises a topic that identifies the message as one to be sent to the recipient using SMS/MMS capabilities of the proxy host device.

6. The method of claim 1, wherein receiving the message further comprises receiving the message in a native format other than an SMS format or an MMS format.

7. The method of claim 6, further comprising determining whether a payload of the message is to be sent as an SMS/MMS message.

8. The method of claim 1, wherein the determination of whether the delivery of the message to the proxy host device or the proxied client device is restricted is further based at least in part on a subject matter of the message.

9. The method of claim 1, wherein the message received by the proxy host device is designated for delivery to the recipient, and wherein the designation is identified in the item of information associated with the message.

10. A non-transitory computer-readable medium having stored thereon computer-executable instructions that, when executed by one or more processors of a proxy host device, cause the one or more processors to perform operations comprising:
    receiving a message from a service provider;
    determining a recipient for the message based at least in part on information included in the message, the recipient being a user associated with the proxy host device and a proxied client device;

determining that delivery of the message to the proxy host device or the proxied client device is not restricted based at least in part on content of the message;

determining that the proxy host device has been designated by the user, via input received at a user interface of the proxied client device, for the proxied client device to utilize messaging capabilities of the proxy host device; and transmitting the message to the proxied client device.

11. The non-transitory computer-readable medium of claim 10, wherein the operations further comprise transmitting a transport acknowledgement to the service provider, wherein the transport acknowledgement is configured to indicate, to the service provider, that the proxy host device received the message and is attempting to transmit the message to the proxied client device.

12. The non-transitory computer-readable medium of claim 10, wherein the operations further comprise transmitting a notification to the proxied client device, wherein the notification enables the proxied client device to display message status information on a user interface of the proxied client device.

13. The non-transitory computer-readable medium of claim 10, wherein the operations further comprise:

determining whether the message was successfully transmitted; and generating a response based at least in part on whether the message was successfully transmitted.

14. The non-transitory computer-readable medium of claim 13, wherein the operations further comprise transmitting the response to one or more of the service provider, the proxied client device, or another authorized device.

15. The non-transitory computer-readable medium of claim 10, wherein the determination that the delivery of the message to the proxy host device or the proxied client device is not restricted is further based at least in part on a subject matter of the message.

16. A proxy host device, comprising:

one or more processors; and a memory storing a set of instructions which when executed by the one or more processors cause the one or more processors to:

receive a message from a service provider;

determine a recipient for the message based at least in part on an item of information associated with the message, the recipient being a user associated with the proxy host device and a proxied client device;

determine whether delivery of the message to the proxy host device or the proxied client device associated with the user is restricted based at least in part on content of the message;

determine whether the proxy host device has been designated by the user, via input received at a user interface of the proxied client device, for the proxied client device to utilize messaging capabilities of the proxy host device; and transmit the message to the proxied client device when the delivery of the message is not restricted and the proxy host device is designated for the proxied client device to utilize the messaging capabilities of the proxy host device.

17. The proxy host device of claim 16, wherein the message from the service provider is received via a persistent connection with the service provider.

18. The proxy host device of claim 16, wherein the determination of whether the delivery of the message to the proxy host device or the proxied client device is restricted is further based at least in part on a subject matter of the message.

19. The proxy host device of claim 16, wherein the item of information associated with the message comprises a topic that identifies the message as one to be sent using SMS/MMS capabilities of the proxy host device.

* * * * *